3,317,499
ZIEGLER-NATTA TYPE OLEFIN POLYMERIZATION CATALYST MODIFIED WITH ORGANIC ACID HALIDES OR SULFUR CONTAINING ORGANIC ACID HALIDES
Kohei Nakaguchi, Masaaki Hirooka, and Toshimichi Fujita, Niihama-shi, Japan, assignors to Sumitomo Chemical Company, Ltd., Osaka, Japan, a corporation of Japan
No Drawing. Filed July 30, 1963, Ser. No. 298,588
Claims priority, application Japan, Aug. 6, 1962, 37/33,603
16 Claims. (Cl. 260—93.7)

The present invention relates to a method for producing crystalline polyolefines. In another aspect, the present invention relates to an improvement in the process for the polymerization of olefines using a catalyst system composed of an organometallic compound of a metal belonging to Groups I to III in the Periodic Table and a halide of a transition metal belonging to Groups IV to VI in the Periodic Table. The term the "Periodic Table" employed herein means the Mendeleev Periodic Table, as published in "Textbook of Organic Chemistry," Carl R. Noller, W. B. Saunders Co., 1958.

It is well known that crystalline polyolefines are produced by polymerization of an α-olefine using a catalyst system composed of an organometallic compound of a metal belonging to Groups I to III in the Periodic Table and a halide of a transition metal belonging to Groups IV to VI in the Periodic Table. It is also well known that a combination of an organoaluminum compound with a solid titanium halide having a lower valency is suitable for the production of crystalline polyolefines in a high yield. When, for instance, a catalyst system of triethylaluminum and titanium trichloride is used for the polymerization of propylene, 75–85% by weight of the total polymer product is insoluble in boiling heptane. When a catalyst system of diethyl-aluminum chloride and titanium trichloride is used, 80–90% by weight of the product is insoluble. Thus, the polymer product always contains 10–25% by weight of amorphous polymer which is soluble in boiling heptane, even when the catalyst systems known to be those yielding a comparatively high proportion of the crystalline polymer are employed.

The physical properties, especially the mechanical properties, of crystalline polyolefines are deteriorated by contamination of amorphous polymer, and minimization of the content of the amorphous polymer is desirable. Accordingly, in the conventional production of crystalline polyolefines it is necessary to remove amorphous polymer from the polymerization product. This fact means not only consumption and loss of olefine monomer used for the formation of the amorphous polymer in the polymerization reaction, but also the necessity of great cost and prodigious labor in the procedure for extraction and removal of the amorphous polymer.

Therefore, it has been desirable to provide a catalyst system which forms a polymer containing no amorphous polymer or an unobjectionably small amount of amorphous polymer. If such a catalyst system could be developed, great benefits would be conferred, in the omission of the extracting procedure of the amorphous polymer heretofore conducted and in the saving of heat energy and chemicals such as solvent. Moreover, if the extraction of the amorphous polymer from the product is not necessary it may be possible to conduct the polymerization in a solvent-free reaction system, i.e. without using any expensive solvent, or at least to conduct the polymerization using any of solvents which may not dissolve the amorphous polymer.

Accordingly, it is an object of the present invention to provide a method for producing crystalline polyolefines in high selectivity by use of a novel catalyst system. Another object is to provide a process for the polymerization of α-olefines which can yield directly solid polyolefines containing little amorphous polymer, in other words, which needs no procedure of extraction or separation of amorphous polymer, or which permits simplification of such procedure. Still another object is to provide a process for the polymerization of α-olefines, which renders possible omission of the polymerization medium, or use of a liquid medium which hardly dissolves amorphous polymer. Further still another object is to provide a novel catalyst system employable for the polymerization of α-olefines which contains, as one component, an organic acid halide. Other objects and advantages will be obvious from the following description.

To accomplish these objects, the present inventors provide a method for producing polyolefines comprising contacting an α-olefine with a catalyst system obtained by mixing an organometallic compound of a metal belonging to Groups I to III in the Periodic Table, a low valency halide of a transition metal belonging to Groups IV to VI in the Periodic Table, and an acid halide of an organic acid selected from the group consisting of carboxylic, thiocarboxylic, sulfinic, and sulfonic acids.

Preferable organometallic compounds of metals belonging to Groups I to III in the Periodic Table, employed in the invention include those of lithium, sodium, potassium, beryllium, magnesium, zinc, cadmium, boron, aluminum, gallium, etc. Particularly, organometallic compounds of aluminum and zinc are suitable. These organometallic compounds have at least one organic residue directly attached to the metal through C-Metal linkage. As to the organic residue, a hydrocarbon residue having 1 to 20 carbon atoms, for example, alkyl, aryl, aralkyl, or cycloalkyl radical, is preferable. Among those are included methyl, ethyl, propyl, butyl, hexyl, phenyl, tolyl, cyclohexyl, cyclopentadienyl, and the like. Thus, the illustrative examples of the organometallic compound include triethylaluminum, triisobutylaluminum, trihexylaluminum, diethylaluminum chloride, diethylaluminum bromide, diisobutylaluminum chloride, di-n-hexylaluminum chloride, diphenyl aluminum chloride, dicyclohexylaluminum chloride, dicyclopentadienylaluminum chloride, ethylaluminum sesquichloride, diethylzinc, and the like. Among those, the dialkylaluminum halides give the most distinguished results.

The halides of transition metals belonging to Groups IV to VI in the Periodic Table include halides of titanium, zirconium, vanadium, chromium, molybdenum, wolfram, etc. The illustrative examples of the halides of metals include titanium trichloride, titanium tribromide, titanium triiodide, vanadium trichloride, chromium trichloride, and the like. Titanium trichloride is especially suitable. These halides may contain other constituents. For example, titanium trichloride produced by a reduction of titanium tetrachloride with aluminum contains aluminum in an atom ratio of Ti:Al of about 3:1. Such a titanium trichloride may also be employed with advantage. Moreover, these metal halides yield higher efficacy when activated by ball milling.

The proportion of the organometallic compound of a metal belonging to Groups I to III in the Periodic Table and the halide of a transition metal belonging to Groups IV to VI in the Periodic Table, may be chosen within the range known in the conventionally employed methods. For instance, the organometallic compound of a metal belonging to Groups I to III in the Periodic Table may be in a proportion of 0.1 to 100 moles per mole of the halide of a transition metal belonging to Groups IV to VI in the Periodic Table.

The organic acid halides employed in the catalyst system according to the present invention include acid halides of carboxylic, thiocarboxylic, sulfinic, and sulfonic acids. They may be represented by the general formulae as follows:

$$RCOX, RCSX, RSOX, RSO_2X$$

In the formulae, X represents a halogen atom and R is a member selected from the group consisting of alkyl, aryl, aralkyl, cycloalkyl, and their derivatives. Particularly preferable is a hydrocarbon residue having 1 to 20 carbon atoms. Exemplified R radicals embrace methyl, ethyl, propyl, butyl, hexyl, lauryl, phenyl, tolyl, naphthyl, benzyl, cyclohexyl, methylcyclohexyl, cyclopentadienyl, and the like, including their derivatives. Thus, the organic acid halides according to the invention involve acetyl chloride, acetyl bromide, acetyl iodide, n-butyryl chloride, isoamylyl chloride, benzoyl chloride, thioacetyl chloride, benzenesulfinyl chloride, benzenesulfonyl chloride, benzenesulfonyl bromide, benzenesulfonyl iodide, o-toluenesulfonyl chloride, m-xylenesulfonyl chloride-(4), benzylsulfonyl chloride, α-naphthalenesulfonyl chloride, cyclohexanesulfonyl chloride, methylcyclohexanesulfonyl chloride, propanesulfonyl chloride, ethanesulfonyl chloride, etc. Also, R may be a hydrocarbon residue containing a hetero atom, such as halogen, nitrogen, oxygen and sulfur. For example, chloroacetyl chloride, p-chlorobenzenesulfonyl chloride, m-chlorobenzenesulfonyl chloride, p-bromobenzenesulfonyl chloride, chloroethanesulfonyl chloride, p-nitrobenzenesulfonyl chloride, p-aminobenzenesulfonyl chloride, 2-aminotoluenesulfonyl chloride, 4-aminophenolsulfonyl chloride, acetylaminobenzenesulfonyl chloride, and the like, may be employed.

The organic acid halides, the third component of the catalyst system, may be employed within a broad range of proportions. In some cases, the third component tends to retard the polymerization reaction, and, the use of too great an amount yields unfavorable results. Accordingly, the amount of the third component should be determined depending upon the kind of the component and other polymerization conditions, so as not to lower much the rate of polymerization. However, the present third component exhibits extremely superior effect for the improvement of stereospecificity and crystallinity of the polymer product even when such a small amount as not significantly affecting the rate of polymerization is employed. In some cases, the present third components do not retard, but even elevate the rate of polymerization. Generally speaking, the organic acid halide, the third component, may be employed in a proportion of 0.001 to 20 moles, preferably 0.01 to 1 mole, per mole of the halide of transition metal of Groups IV to VI in the Periodic Table. If desired or if required, a proportion not falling within the range as above-mentioned may be employed.

To prepare the catalyst system of the present invention, the three components may be mixed in an arbitrary sequence. For instance, an organic acid halide may be mixed with an organometalic compound of a metal of Groups I to III in the Periodic Table, and the mixture may be heated if desired. Then, a halide of a transition metal belonging to Groups IV to VI in the Periodic Table is added to the mixture.

The polymerization of α-olefines according to the invention is effected by contacting an α-olefine with the catalyst system as described above. The temperature for the polymerization reaction may be from room temperature to 120° C., particularly from 50° to 90° C. The pressure for the reaction may be from atmospheric pressure to 100 kg./cm.² gauge, depending upon the α-olefine employed. In general, a pressure of 0 to 15 kg./cm.² gauge is preferable.

The polymerization of the present invention is suitably carried out in the presence of a solvent which is inert to the reaction. Suitable are hydrocarbon solvents, for example, aliphatic, alicyclic and aromatic hydrocarbon solvents, such as propane, butane, pentane, hexane, heptane, octane, cyclohexane, methylcyclohexane, tetralin, decalin, benzene, toluene, xylene, liquid paraffin, and various saturated petroleum fractions. Also, halogenated hydrocarbon solvents may be suitably employed, such as chlorobenzene, chloronaphthalene, ortho-dichlorobenzene, etc.

As mentioned above, it is a feature of the method of the present invention that the separation procedure for amorphous polymer after the polymerization is not required since the present method produces crystalline polymer selectively. Accordingly, a polymerization system containing a solvent which does not dissolve amorphous polymer and which is therefore considered not to be so adequate for the conventional polymerization systems, for example, propane, butane, pentane, hexane, etc., or a polymerization system in which the monomer per se serves as solvent, may be employed effectively. Alternatively, a polymerization system containing no solvent may be employed. For example, polyolefines may be continuously produced in a fluidized system in which the catalyst system is supported on a carrier.

The α-olefines to be polymerized according to the method of the present invention are preferably those having 3 to 10 carbon atoms. As the exemplified α-olefines, propylene, butene-1, pentene-1, 2-methylpentene-1, hexene-1, and styrene may be mentioned. Particularly, the method of the invention is adequately applied for the production of a stereo-specific polymer of propylene.

In carrying out the method of the invention, various modification can be made. For instance, an additive may be added in the polymerization in order to control the molecular weight of the polymer produced. The molecular weight of the polymer may be restricted to a desired degree without effect on the crystallinity of the polymer, by addition of hydrogen to the polymerization system.

The present invention will be illustrated more minutely with reference to the following examples, which are, however, set forth merely by way of illustration and not by way of limitation.

*Example 1*

Into an 800 ml.-volume stirring-type stainless steel autoclave preliminarily flushed with nitrogen, 400 ml. of n-heptane, 1.95 g. of diethylaluminum chloride, 0.31 g. of titanium trichloride and 0.35 g. of benzenesulfonyl chloride were added. Propylene was fed into the autoclave to make the pressure 5 kg./cm.² gauge at 70° C., and polymerized for 3 hours keeping the pressure and the temperature at that level. After the reaction was stopped with methanol, 39.5 g. of polypropylene was obtained. The polymer was extracted with boiling heptane, and 97.3% by weight of the total polymer remained undissolved.

In the case where the same polymerization was repeated without using benzenesulfonyl chloride, 88.2% by weight of the total solid polymer was insoluble in boiling heptane.

*Example 2*

The same polymerization as in Example 1 was repeated, except that 0.14 g. of benzoyl chloride was employed instead of the benzenesulfonyl chloride, and that the polymerization was effected for 2 hours. The resulting polypropylene weighed 41.3 g., of which 96.1% by weight was insoluble in boiling heptane.

*Example 3*

The same polymerization as in Example 1 was repeated, except that 0.08 g. of acetyl chloride was employed instead of the benzenesulfonyl chloride, and that the polymerization was effected for 2 hours. The resulting polypropylene weighed 47.7 g., of which 94.6% by weight was insoluble in boiling heptane.

Example 4

The same polymerization as in Example 1 was repeated, except that 0.41 g. of p-toluenesulfonyl chloride was employed instead of benzenesulfonyl chloride. The insoluble part of the resulting polymer in boiling heptane was 96.7%.

Example 5

Into an 800 ml.-volume stirring-type stainless steel autoclave preliminarily flushed with nitrogen, 400 ml. of n-heptane, 2.28 g. of triethylaluminum, 3.55 g. of vanadium trichloride, and 0.35 g. of benzenesulfonyl chloride, were added. Propylene was fed into the autoclave to make the pressure 5 kg./cm.$^2$ at 70° C., and polymerized for 2 hours keeping the pressure and the temperature at that level. After the polymerization was stopped by adding methanol, 70.0 g. of a snow white polypropylene was obtained. The polymer was extracted with boiling heptane, and 85.1% by weight of the total solid polymer remained undissolved.

The same polymerization was repeated without using benzenesulfonyl chloride. The resulting solid polymer weighed 52 g., of which 74.2% was insoluble in boiling heptane.

Example 6

The same polymerization as Example 1 was repeated, except that butene-1 was employed instead of propylene. A crystalline solid polymer, polybutene, having a melting point of 123° C., was produced selectively.

What we claim is:

1. A method for producing polyolefines comprising contacting an α-monoolefine having 3-10 carbon atoms with a catalyst system obtained by mixing (1) an organometallic compound which is a compound of a metal selected from Groups IA, IIA, IIB and IIIB of the Periodic Table and a hydrocarbon residue having 1-20 carbon atoms directly attached to the metal by a carbon-metal linkage, (2) a halide of a transition metal in which the valency of the metal is below its maximum value, the transition metal being selected from Groups IVA, VA and VIA of the Periodic Table, and (3) an acid halide of an organic acid selected from the group consisting of carboxylic, thiocarboxylic, sulfinic, and sulfonic acids.

2. A method according to claim 1, in which the said α-monoolefine is selected from propylene and butene-1.

3. A method according to claim 1, in which the said organometallic compound is selected from the group consisting of triethylaluminum and diethylaluminum chloride.

4. A method according to claim 1, in which the said halide of a transition metal is selected from the group consisting of titanium trichloride, and vanadium trichloride.

5. A method according to claim 1, in which the said acid halide is selected from the group consisting of benzenesulfonyl chloride, toluenesulfonyl chloride, benzoyl chloride, and acetyl chloride.

6. A method according to claim 1, in which the amount of the said organometallic compound employed is 0.1 to 100 moles per mole of the halide of a transition metal, and the amount of the said acid halide is 0.001 to 20 moles per mole of the halide of a transition metal.

7. A method according to claim 1, in which the said α-monoolefine is contacted with the said catalyst system at a temperature between room temperature and 120° C., at a pressure of 0 to 15 kg./cm.$^2$ gauge.

8. A method according to claim 1 in which the organometallic compound comprises a hydrocarbon residue selected from the group consisting of alkyl, aryl, aralkyl, and cycloalkyl radicals.

9. A method for producing polyolefines comprising contacting an α-monoolefine having 3-10 carbon atoms with a catalyst system obtained by mixing (1) an organometallic compound which is a compound of a metal selected from the group consisting of lithium, sodium, potassium, beryllium, magnesium, zinc, cadmium, boron, aluminum and gallium, and a hydrocarbon residue having 1 to 20 carbon atoms directly attached to the metal by a carbon-metal linkage, (2) a halide of a transition metal in which the valency of the metal is below its maximum value, the transition metal being selected from the group consisting of titanium, zirconium, vanadium, chromium, molybdenum and wolfram, and (3) an acid halide of an organic acid selected from the group consisting of carboxylic, thiocarboxylic, sulfinic, and sulfonic acids.

10. A catalyst system comprising (1) an organometallic compound which is a compound of a metal selected from Groups IA, IIA, IIB and IIIB of the Periodic Table and a hydrocarbon residue having 1-20 carbon atoms directly attached to the metal by a carbon-metal linkage, (2) a halide of a transition metal in which the valency of the metal is below its maximum value, the transition metal being selected from Groups IVA, VA and VIA of the Periodic Table, and (3) an acid halide of an organic acid selected from the group consisting of carboxylic, thiocarboxylic, sulfinic, and sulfonic acids.

11. A catalyst system comprising (1) an organometallic compound which is a compound of a metal selected from the group consisting of lithium, sodium, potassium, beryllium, magnesium, zinc, cadmium, boron, aluminum and gallium, and a hydrocarbon residue having 1 to 20 carbon atoms directly attached to the metal by a carbon-metal linkage, (2) a halide of a transition metal in which the valency of the metal is below its maximum value, the transition metal being selected from the group consisting of titanium, zirconium, vanadium, chromium, molybdenum and wolfram, and (3) an acid halide of an organic acid selected from the group consisting of carboxylic, thiocarboxylic, sulfinic, and sulfonic acids.

12. A catalyst system comprising diethylaluminum chloride, titanium trichloride, and benzenesulfonyl chloride.

13. A catalyst system comprising diethylaluminum chloride, titanium trichloride, and benzoyl chloride.

14. A catalyst system comprising diethylaluminum chloride, titanium trichloride, and acetyl chloride.

15. A catalyst system comprising triethylaluminum, vanadium trichloride, and benzenesulfonyl chloride.

16. A catalyst system comprising diethylaluminum chloride, titanium trichloride and p-toluene sulfonyl chloride.

References Cited by the Examiner
UNITED STATES PATENTS

| | | | |
|---|---|---|---|
| 3,082,198 | 3/1963 | Klein | 260—94.9 |
| 3,161,628 | 12/1964 | Dost et al. | 260—94.9 |
| 3,163,611 | 12/1964 | Andersen et al. | 260—94.9 |

JOSEPH L. SCHOFER, *Primary Examiner.*

M. B. KURTZMAN, *Assistant Examiner.*